Nov. 5, 1957  C. M. RIDER  2,811,755
SEMI-SELF-STORING AWNING
Filed May 26, 1955  3 Sheets-Sheet 1
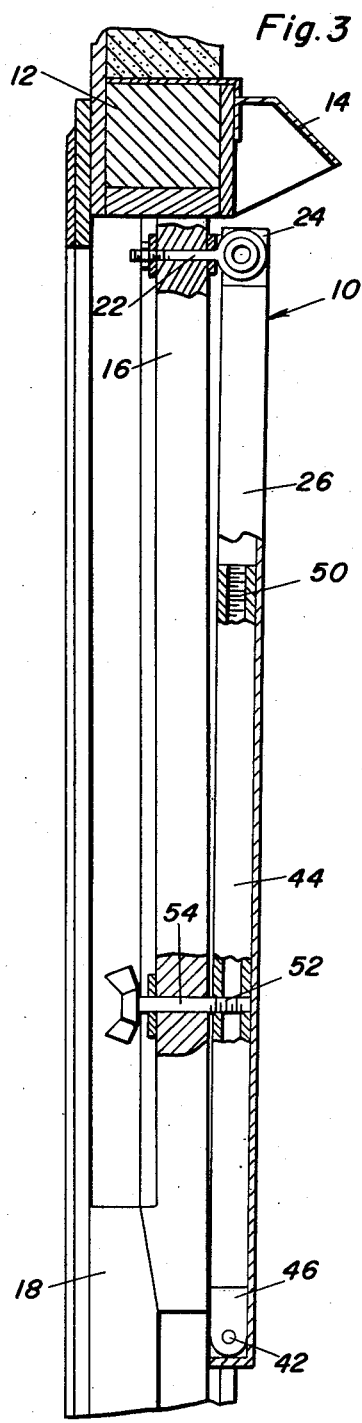
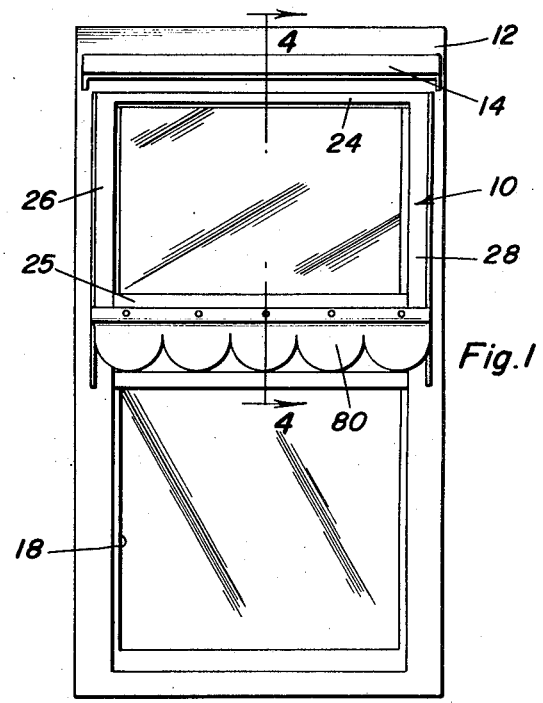
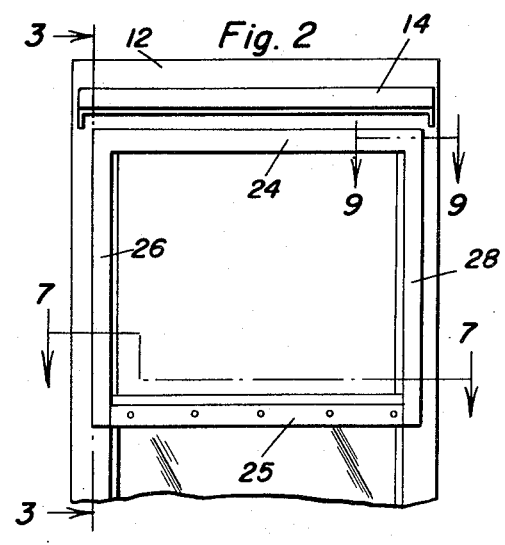
Clifford M. Rider
INVENTOR.

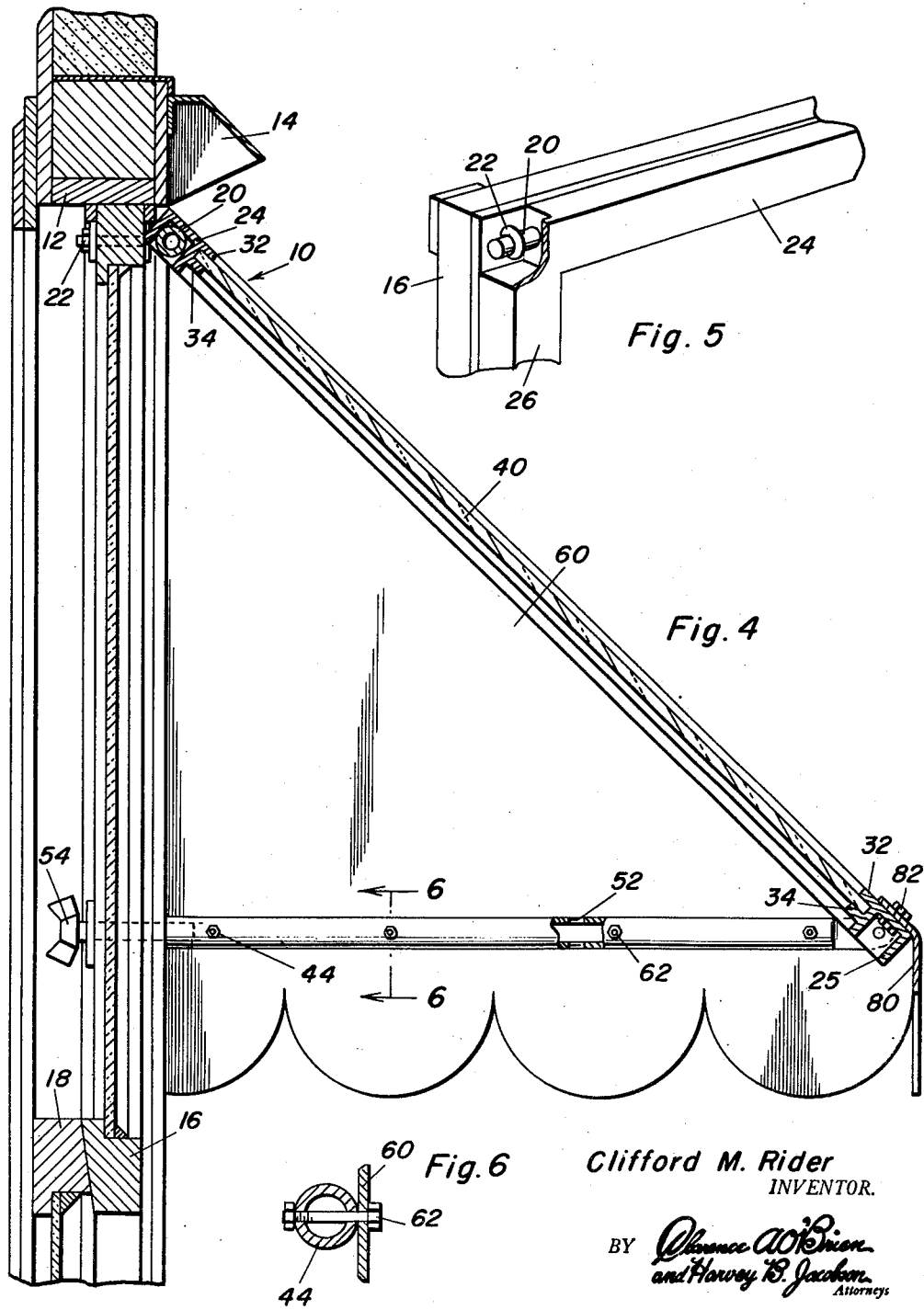

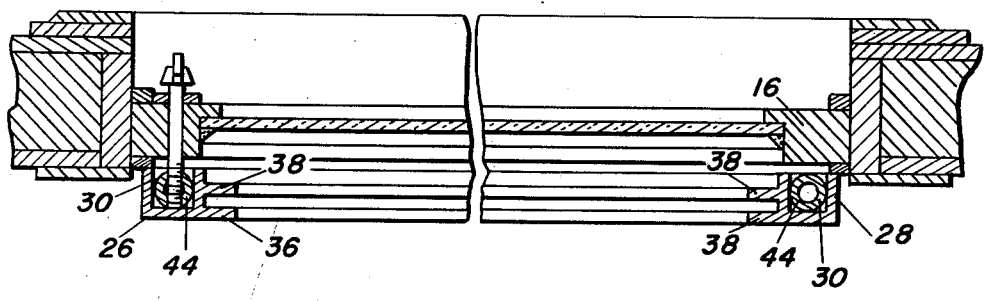
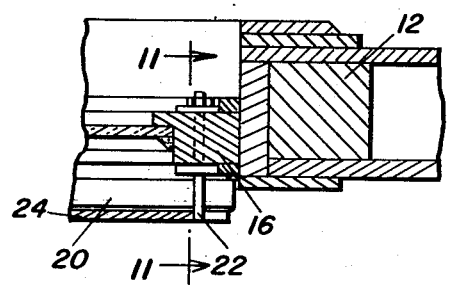
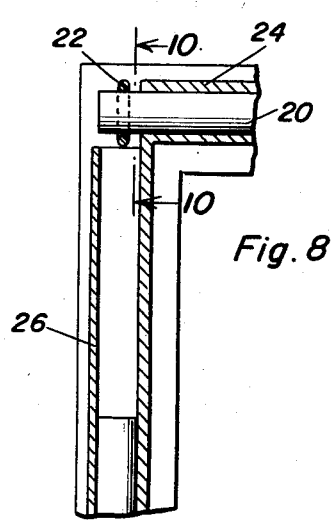
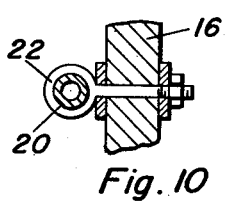
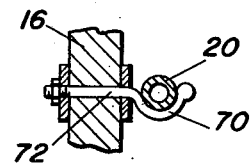
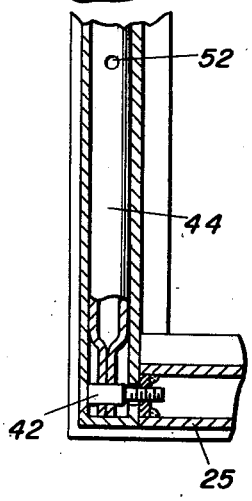
Clifford M. Rider
INVENTOR.

United States Patent Office 2,811,755
Patented Nov. 5, 1957

2,811,755

SEMI-SELF-STORING AWNING

Clifford M. Rider, Kansas City, Mo., assignor of twenty percent to Dale Cross, twenty percent to Harold J. Rider, twenty percent to Vernon Rider, Kansas City, Mo., and twenty percent to Joshua A. Rider, Mission, Kans.

Application May 26, 1955, Serial No. 511,212

7 Claims. (Cl. 20—57.5)

This invention comprises novel and useful improvements in a semi-self-storing awning and more specifically relates to a rigid awning panel of translucent or transparent material adapted for interchangeable and selective use as a component of an awning or as a storm shutter for windows.

The principal purpose of this invention is to provide a novel and improved collapsible awning frame construction which may be selectively employed as an awning or may be stored in a lowered or collapsed position against a window frame; which may advantageously be provided with the transparent panel of a conventional storm window as the awning roof panel.

A further object of the invention is to provide a window protective construction as set forth in the foregoing object having improved means for retaining the same in a raised, awning functioning position or in a lowered and stored position.

A further object of the invention is to provide an improved construction in accordance with the preceding objects having improved means for retaining a transparent or translucent pane or panel in the collapsible supporting framework of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view of a window opening showing the self storing awning framework of this invention in position to function as an awning;

Figure 2 is a fragmentary view similar to Figure 1 but showing the awning in its lowered, collapsed or stored position;

Figure 3 is a vertical transverse sectional view taken upon an enlarged scale substantially upon the plane indicated by the section line 3—3 of Figure 2 parts being omitted and broken away, and showing the manner in which the collapsible supporting frame of the awning is secured in its lowered or stored position;

Figure 4 is a vertical transverse sectional view taken upon an enlarged scale substantially upon the plane indicated by the section line 4—4 of Figure 1 and showing the device in its raised position to function as an awning for a window opening;

Figure 5 is a fragmentary detail view in perspective of the hinged mounting of the frame, parts being broken away;

Figure 6 is a detail view in vertical section taken substantially upon the plane indicated by section line 6—6 of Figure 4 and showing the manner in which a side panel of the awning is secured to a cross-member of the awning frame;

Figure 7 is a horizontal sectional view, taken upon an enlarged scale substantially upon the plane indicated by section line 7—7 of Figure 2, parts being broken away;

Figure 8 is a fragmentary view partly in section, parts being broken away and illustrating certain details of the collapsible supporting frame of the awning with a brace rod folded therein when the frame is in its stored position;

Figure 9 is a horizontal sectional detail view taken upon an enlarged scale substantially upon the plane indicated by section line 9—9 of Figure 2 and showing further details of the hinged mounting;

Figures 10 and 11 are detail views taken in section substantially upon the planes indicated by section lines 10—10 and 11—11 of Figures 8 and 9, respectively; and, Figure 12 is a perspective view of one of the brace rods forming part of the supporting framework of the awning.

The present invention is intended for use with a conventional type of storm window having a removable glass panel or transparent pane. This panel is removed from the storm window and inserted into a collapsible or semi-self-storing awning frame, after a light filtering film or coating is applied to the panel where the latter functions as an awning roof panel. The transparent panel is thus used interchangeably between the storm window and the awning, the panel receiving and supporting frame of the latter being collapsed or folded against the window frame in an improved manner when the panel is being employed in the storm window.

Referring first primarily to Figures 1 and 4 of the accompanying drawings, it will be seen that the collapsible, self-storing awning assembly designated generally by the numeral 10 is shown applied to a conventional window or similar opening 12. There may be provided the customary storm cap or protective hood 14 disposed above the junction of the collapsible awning with the window opening, although in some instances this element may be omitted, if desired.

As will be seen best from Figures 3, 4, 7 and 9, the collapsible awning 10 is mounted upon an upper window sash 16 with which the window opening 12 is provided, the lower sash being shown at 18 in Figures 1, 3 and 4.

The upper portion of the awning assembly is provided with a transverse rod or tubular member 20, see also Figure 8, which is pivotally carried by a pair of eye bolts 22 mounted in the upper window sash 16. By this means, the awning may be raised or lowered with the upper sash 16, and also may be pivoted from a collapsed, stored or lowered position shown in Figure 3 to an upper or raised position shown in Figure 4, and in which latter position the device functions as a window awning.

There is provided a generally rectangular frame consisting of horizontal top and bottom frame members 24 and 25, the former having a longitudinal chamber or recess therein receiving the above mentioned supporting rod 20. The supporting frame also includes a pair of side frame members 26 and 28. Each of the members 26 and 28 is generally U-shaped in cross-section, as shown best in Figure 7, to provide longitudinally extending channels 30 therein.

As shown in Figure 4, the upper horizontal frame member 24 is provided with a pair of spaced lateral flanges 32 and 34. In a similar manner, the longitudinal or side frame members 26 and 28 are likewise provided with spaced lateral flanges 36 and 38 which are complementary to each other and which correspond to the flanges 32 and 34 of the upper horizontal frame member 24. In a similar manner, the lower horizontal frame member 25 is provided with flanges 32 and 34 corresponding to the flanges of the upper horizontal member. The flanges of these four members serve to receive and support a panel or sheet 40 constituting the roof panel of the awning and which sheet may be of a translucent or transparent material such as glass or the like. In assembling the roof panel, it is preferred to remove the lower horizontal frame member 25 and slide the panel 40 upwardly between the two side frame members 26 and 28, the spaced flanges 36 and 38 thereof, until the panel is in its uppermost position as shown in Figure 4 and is also received at its upper end between the flanges 32 and 34 of the upper horizontal frame member. Thereafter, the lower frame member 25 is applied whereby the roof panel is held between the spaced flanges of all four of the frame members.

It may be here noted that the panel 40 is a transparent, removable panel of a conventional storm window assembly. In summer the panel 40 is removed from the storm window, coated with a film of light filtering material and is slid into the awning frame and secured. In winter the panel 40 is removed, the filtering film cleaned therefrom and it is again inserted into the storm window construction. The awning framework remains upon the window frame all year, being collapsed or stored as in Figures 3 and 8 in the winter, and being raised or opened as in Figure 4 in the summer.

Referring now particularly to Figure 8 it will be seen that the lower horizontal frame member 25 is secured to the lower ends of the two longitudinal side frame members 26 and 28 by means of a combined bolt and pivot pin 42. This pivot pin also serves to pivotally secure a tubular brace rod 44, see also Figure 12, by extending through the apertured lower end 46 of this rod. By virtue of its pivotal connection, each of the rods 44 may be pivoted into the hollow open channels of the longitudinal side frame members 26 and 28, as indicated in Figures 3, 7 and 8.

Referring now especially to Figure 3, it will be seen that the brace rod 44 is provided with an internally threaded axial bore 50 at its extremity which is remote from the pivot 42, and with a diametrically disposed threaded bore 52 intermediate its ends. By means of wing bolts 54 carried by the sash 16, the threaded bore 52 may be engaged in order to secure the rods 44 and thereby fasten the awning construction in its lowered position as in Figure 3; or the wing bolts may be alternatively engaged in threaded extremities 50, as shown in Figure 4, in order to secure the awning in the raised position. It will thus be observed that the brace rods 44 serve the dual functions of engaging and cooperating with a fastener for securing the awning in either its raised or lowered position.

As indicated, in Figures 4 and 6, end panels 60 of any desired construction may be secured to the side of the awning, being attached to the transverse rods 44 as by means of bolts 62 or the like, whereby the sides of the awning may be detachably connected thereto.

In some instances, as may be seen by comparing Figures 10 and 11, it may be preferred to employ the eye bolt 22 for securing one end of the upper supporting rod 20, while the other end of the same may be secured as by a bracket 70 carried by a bolt 72 mounted upon the upper window sash 16.

As will be seen by reference to Figures 1 and 4, a valance consisting of a scalloped skirt or apron 80 may be secured to and depend from the lower horizontal frame member 25 by means of bolts 82.

When the awning is to be collapsed for storage from its erected or assembled position of Figure 4, it is merely necessary to remove the bolts and detach the side panels 60 and the valance 80, and thereafter disengage the wing bolts 54 from the internally threaded extremities 50 of the brace rods, and after folding the latter into the channels 30 of the longitudinal side frame members 26 and 28, the entire awning assembly may be collapsed into the position shown in Figure 3. The wing bolts 54 may then be engaged in the threaded bores 52 whereupon the awning may be clamped or locked in its lowered position and may thereby function as a shutter or window protector for the window sash.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collapsible awning construction for windows comprising an awning roof panel, a supporting frame for said roof panel, means hingedly mounting the upper end of said frame for vertical swinging movement of said panel about a generally horizontal axis from a raised inclined position for functioning as an awning to a lowered vertical position for functioning as a shutter, a pair of brace rods each pivoted at one end of each to the lower portion of the supporting frame for swinging movement, said rods each having a threaded axial bore at the other end of each and a threaded diametrical bore intermediate the ends, fasteners stationarily mounted and selectively engageable in the axial and diametrical bores of the brace rods for securing the panel in raised and lowered positions respectively.

2. The combination of claim 1 wherein said frame includes pairs of horizontal and longitudinal frame members, at least one pair of said frame members having sets of spaced parallel flanges, said roof panel being slidably received and removably retained between said spaced parallel flanges.

3. The combination of claim 1 wherein said frame includes pairs of horizontal and longitudinal frame members, at least one pair of said frame members having sets of spaced parallel flanges, said roof panel being slidably received and removably retained between said spaced parallel flanges, a common fastening means for securing one of the horizontal frame members to one of said longitudinal frame members and to one of said brace rods.

4. The combination of claim 1 wherein said supporting frame includes a pair of longitudinal frame members having open channels therein opening to the lower side of said members, said brace rods being foldable into said channels when the awning is collapsed.

5. The combination of claim 1 wherein said supporting frame includes an upper horizontal frame member having a channel therein, said first mentioned means including a hinge rod received in said channel and support members secured to a window sash and pivotally engaging said hinge rods in said channel.

6. The combination of claim 1 including side panels mounted on said supporting frame, means securing said side panels to said brace rods.

7. The combination of claim 1 including a valance, said supporting frame having a lower horizontal frame member, means securing said valance to the latter.

References Cited in the file of this patent

UNITED STATES PATENTS

| | | |
|---|---|---|
| 311,510 | Moneyment | Feb. 3, 1885 |
| 1,668,170 | Plym | May 1, 1928 |
| 2,233,315 | Jones | Feb. 25, 1941 |
| 2,618,820 | Struben et al. | Nov. 25, 1952 |
| 2,629,143 | Spector et al. | Feb. 24, 1953 |
| 2,629,904 | Bristow | Mar. 3, 1953 |
| 2,673,378 | Poillon | Mar. 30, 1954 |